United States Patent [19]

Senaha et al.

[11] 4,379,199
[45] Apr. 5, 1983

[54] HEAT-RESISTING LAYER-CONSTRUCTIONS AND METHOD FOR PREPARING THE SAME

[75] Inventors: Susumu Senaha; Tetsuya Chiba; Akira Ohno; Shitomi Katayama, all of Kanagawa, Japan

[73] Assignees: Yokohama Kiko Co.; NHK Spring Co., Ltd., both of Kanagawa, Japan

[21] Appl. No.: 287,855

[22] Filed: Jul. 29, 1981

Related U.S. Application Data

[63] Continuation of Ser. No. 26,396, Apr. 2, 1979, abandoned.

[30] Foreign Application Priority Data

Apr. 1, 1978 [JP] Japan ................................ 53/39409

[51] Int. Cl.³ ..................... B32B 9/04; B32B 15/08; B32B 27/06

[52] U.S. Cl. ..................................... 428/332; 428/334; 428/335; 428/336; 428/339; 428/447; 428/450

[58] Field of Search ................ 428/447, 332, 334–336, 428/339, 450

[56] References Cited

U.S. PATENT DOCUMENTS

| | | | |
|---|---|---|---|
| 4,042,643 | 8/1977 | Creasey et al. | 428/447 |
| 4,052,331 | 10/1977 | Dumoulin | 428/447 X |
| 4,103,045 | 7/1978 | Lesaicherre et al. | 428/447 X |

Primary Examiner—Thomas J. Herbert, Jr.
Attorney, Agent, or Firm—Sughrue, Mion, Zinn, Macpeak & Seas

[57] ABSTRACT

The present invention relates to heat-resisting layer-constructions consisting of base substrates such as plates, boards and sheets, and silicone polymers having high contents of aryl radicals painted and thermally cured to adhere on the surfaces of the base substrates, and the method of preparing the same.

5 Claims, 4 Drawing Figures

HEAT-RESISTING LAYER-CONSTRUCTIONS AND METHOD FOR PREPARING THE SAME

This application is a continuation application of Ser. No. 26,396, filed Apr. 2, 1979, now abandoned.

BACKGROUND OF INVENTION

Many kinds of coated boards are known in which various kinds of heat-resisting polymers are coated on solid base plates, such as metal plates and ceramic plates.

Typical examples are:

(1) Processes of producing coated films by coating and curing resins containing methylol groups, such as phenol resins, melamine resins, urea resins and furan resins on base plates, by condensation reactions of methylol groups with the elimination of water.

Although coated films of high hardness are obtained from these inexpensive resins, these processes have many disadvantages in that the coated films have only moderate and not very high heat resistivities, polar molecules are likely to remain in the cured films because aldehydes are present in the aqueous solutions or emulsions used as starting materials, the resulting coated film has a disagreeable odor and toxicity problems arise and properties of the films tend to deteriorate upon heating liberating aldehydes.

(2) Processes using epoxy or polyester resins:

These types of resins can be used without employing a solvent and have merits in non-liberation of aldehydes on storage for a long time. However, the curing rate is slow, and the coated films have low resistivity against hydrolysis, tend to liberate a small amount of water with the passage of time, and their thermal stability is not very high but rather is medium.

(3) Processes using aromatic resins such as polyimides or polyimidazoles:

These resins show higher heat resistivities than the resins described in paragraphs (1) and (2), but suffer from such disadvantages as very poor workability, tendency of the solvents used to remain in the cured films, reactivity with certain kinds of metals at elevated temperatures, and easy formation of pinholes on the film surfaces.

(4) Processes using polytetrafluoroethylene or the related polymers:

These kinds of resins have high thermal stability, but the worst disadvantage is the extremely low workability in that formation of a smooth coating surface is very difficult. Some modified kinds of fluoropolymers with improved workability are known, but their heat resistivity and weather resistivity are poorer than those of our invention. Other disadvantages are painting ability and poor adhesive strength to the substrates.

Silicone resins, which have been found wide applications in recent years, show excellent resistivity against heat, weathering, water and chemicals. On the other hand, they suffer from various disadvantages such as low surface hardness, easy heat distortion, poor adhesion and painting abilities, and high moisture permeability. These are due to the intrinsic characteristics of polydimethylsiloxane used as the main component. If polydiphenylsiloxane is used in place of polydimethylsiloxane, some of these properties, such as adhesive and painting abilities, surface hardness and moisture permeability, may be improved. But the rate of curing of polyphenylsiloxanes is slower, and cracks are likely to be formed in the cured films when curing is intentionally accelerated. Because of these troubles, there have been no examples disclosed in which a film-layer is successfully prepared from these types of resins alone.

As described on page 144 of Nakajima and Ariga "Silicone Resins", Plastics Materials Series, Vol 9, (1974) (Nikkan Kogyo Shimbunsha, Japan), for example, it has been generally accepted that a coated film with highest heat resistance can be obtained from a polysiloxane having a phenyl group content of 20–60%; while on the other hand if the phenyl group content exceeds 60%, the hardness of the film may increase, but the rate of polymerization will become slower to cause various problems in processing, such as the formation of only brittle polymers with low molecular weights.

OBJECT OF INVENTION

The object of the present invention is to offer a heat resisting, layer-constructions by using highly thermally stable polysiloxane resins completely free from the disadvantages mentioned above.

DESCRIPTIONS OF INVENTION

Figure 1:
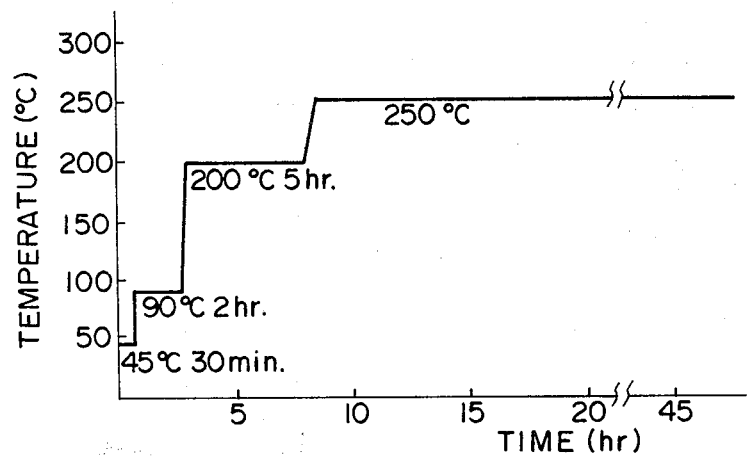
FIGS. 1 and 4 show the heating programs in terms of curing time and curing temperature.

Our studies have revealed that the object of the present invention can be achieved by polymerizing a liquid or low melting polyaralkylsiloxane consisting of the structural units having the general formula represented below under specific conditions:

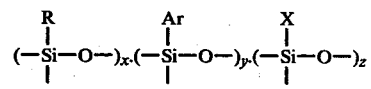

wherein R is a lower (-carbon) alkyl radical, such as methyl, ethyl and propyl, among which a methyl radical is preferable; Ar denotes an aryl radical, such as phenyl, tolyl and naphthyl, among which phenyl is preferable; X represents a polycondensable functional radical, such as a hydroxy radical, an alkoxy radical, such as methoxy, ethoxy, propoxy and butoxy, and an acyloxy radical such as acetoxy, propoxy and butyloxy. The free bond in every structural unit in the structural formula above may be selected from any of these functional groups above, or every free bond may combine to one another to form a bridging bond, or any arbitrary mono-functional radical such as a hydrogen atom may be combined with any of the free bonds in which the following three conditions are met:

(1) $0.65 \leq$ Molar fraction, aryl radicals/(aryl radicals+alkyl radicals) $\leq 1.00$ (2) $2 \leq$ Polycondensable functionality $\leq 3$ (3) $4.25 \leq$ Number of carbon atoms/number of silicone atoms $\leq 16$ Condition (1) defines the content of aryl radicals, condition (2) gives the requirement for effective polymerization to take place, and condition (3) is necessary to assure a sufficient content of effective aryl radicals.

The resins as defined above, when they are relatively low-viscous liquids, may be applied without dilution, but are used as solutions in solvents capable of dissolving them when they are solids or highly-viscous liquids. As examples of the solvents employed, there may be mentioned, among others, aromatic hydrocarbons, such as toluene and xylenes, chlorinated aromatic hydrocarbons, such as chlorobenzene and dichlorobenzenes, and chlorinated aliphatic hydrocarbons, such as methylene chloride and trichloroethylenes.

It is generally preferable to use a solution of higher concentration when a coated film of larger thickness is desired, and to use a solution of lower concentration when a coated film of smaller thickness is desired. However, if a coating solution of excessively high concentration is used, vaporization of the solvent from the cured film will be very difficult, adversely affecting the properties of the cured film due to the remaining solvent. In this case, it is preferable to apply several coatings using a solution of moderate concentration. Thus, the desired resin concentration of the coating solution used in the present invention is in the range of 5–70%, preferably 5–30%.

There is no limitation to the thickness of the coating film, but a thickness in the range of 1 to 200μ, preferably 5 to 50μ, is advantageous in preventing formation of cracks in the surface of the cured film.

There is no limitation to the base substrates to which the resins are to be coated. Any substrate with a smooth surface to allow uniform coating of the resin solution may be used. Typical examples of such base substrates are metal plates, such as plates of iron, aluminum, duralmin, stainless steel, copper, brass and zinc; plastic plates, such as plates of ABS polymer, polyacrylate, polycarbonate, AS polymer, nylon and polyester; wooden plates with or little solvent absorbability, such as teak, lauan and oak; and inorganic plates with low solvent absorption, such as plates of glass, quartz, marble, slate and ceramics as well as asbestos millboards.

It has been discovered from our studies that a cured film with excellent characteristics free from cracks can be obtained by painting the resin solution as defined above on a base substrate and curing by heating, in the presence or absence of a curing agent, in three heating steps.

A solution of the polyaralkylsiloxane containing a curing agent is painted on a base substrate by any of spraying, brushing, dipping or other methods, and the painted film is heated in an heating oven in the following three heating steps.

The first-step heating: During this step, most of the solvent is evaporated at temperatures from room temperature up to the boiling point of the solvent used, generally from room temperature to 100° C., preferably from 30° C. to 60° C., over a period of 5–100 minutes, preferably 20–40 minutes.

The second-step heating: A polycondensation reaction is allowed to proceed during this period. Many of the polymerizable functional groups in the resin react with the elimination of low molecular weight products in quantities. Therefore, if a higher reaction temperature is used, the dried film which remains still weak in strength tends to be broken by the rapid elimination of the low molecular products, causing various troubles in the cured film, such as cracks, pinholes and delamination. Thus, heating must be carried out at temperatures from 80° C. to 230° C., preferably from 100° C. to 200° C. over a period of one to 24 hours, preferably from one to 10 hours.

Figure 2:
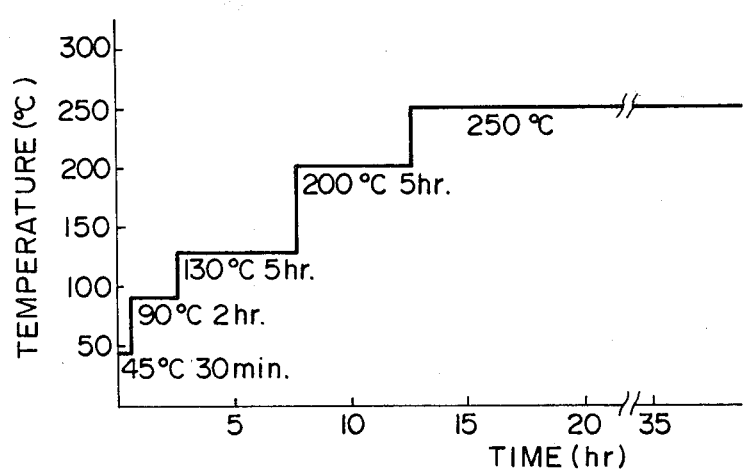
Figure 3:
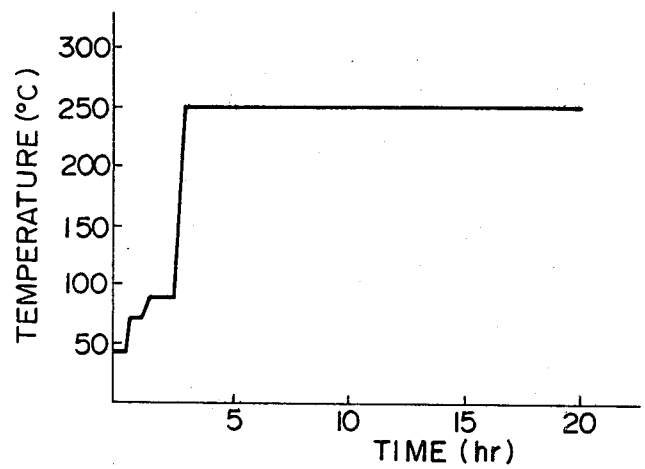
Figure 4:
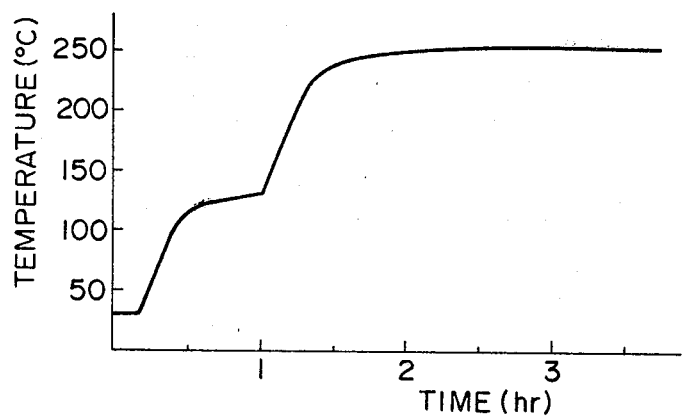

Heating conditions for this step are not so critical in conventionally used silicone resins in which the content of aryl radicals is very low; however, this heating step is most important to obtain a satisfactory cured film from a polysiloxane having an extremely high content of aryl groups as used in the present invention. Compared with those consisting largely or exclusively of alkyl radicals, polysiloxanes having a high content of aryl radicals have low rates of condensation. If a higher temperature is employed or a curing agent of higher activity is used in quantity to achieve a comparable rate of condensation, the result is the formation of weak, or cracked, cured films. The third-step heating: During this step, curing of the film is completed in which the remaining polymerizable functional groups are completely reacted and the aging of the cured film proceeds. Heating is carried out at temperatures from 200° C. to 350° C., preferably from 230° C. to 280° C. for one hour to 2 days, preferably from 3 to 20 hours. It is not always necessary to conduct the above-mentioned three-step heating separately; instead, it is preferable to conduct heating according to a scheduled continuous heating program as shown in FIGS. 2–4, rather than to heat in the multi-step discontinuous manner as illustrated in FIG. 1.

The resin solution to be used in the present invention does not need to contain a catalyst, but it is preferable to add a suitable curing agent to control the curing rate.

The amount of curing agent added may differ with its activity, but is generally 5 weight % or less, preferably 2 weight % or less. It should be understood that a curing agent with higher activity can be added in smaller amounts, while a curing agent with lower activity can be added in a little larger amounts. When a curing agent with high activity is used or a curing agent with low activity is employed in a large amount, it is necessary to perform curing according to a slow-heating program as shown later. On the other hand, when a curing agent with low activity is used or a curing agent with high activity is employed in a small amount, heating may be better carried out according to a program for relatively rapid heating.

A large number of curing agents for silicone resins are known: organic and inorganic acid catalysts, such as lead octanoate, various organic phosphates, trichloroacetic acid, boron trifluoride etherate, dimethyl sulfate, phenylpropionic acid, phosphorus pentoxide, toluenesulfonic acid, benzoic acid, m-cresol, phenol, phosphoric acid, polyphosphoric acid, hydrochlorides of amines, sulfuric acid, benzenesulfaminic acid, benzenesulfonic acid, toluenesulfonic acid, tin tetrachloride, phenylacetic acid, and phenylbutyric acid; basic catalysts, such as tetrabutylammonium hydroxide, tetrabutylphosphonium hydroxide, lithium hydroxide, potassium hydroxide and ethylenediamine; and metal salt catalysts, such as dibutyltin dilaurate, stannous octoate, cobalt naphthenate, lead octoate, tetrabutyl titanate, tetra-iso-propyl titanate, lead laurate, zinc stearate, dibasic lead octoate, dibutyltin mercaptide, tribenzyltin laurate, and tribenzyltin stearate.

The silicone resins used in the present invention have a low rate of polymerization and tend to cause cracking and delamination when the curing is accelerated. Care must be taken to select a suitable curing agent and to adopt proper heating conditions.

In order to obtain a smooth coating film with excellent characteristics free from cracks, it is preferable to use as the curing agent an organic acid, a derivative thereof, a metal salt thereof, an organic amine, a substance capable of producing any of these compounds through decomposition on heating, or a mixture thereof. As the metal for the organic acid salts, a typical amphoteric element, such as tin and aluminum, or a transition metal, such as iron, nickel and cobalt, is preferable.

Typical examples of the curing agents used in the present invention include organic acids and compounds capable of producing organic acids through decomposition on heating, such as octanoic acid, acetic acid, propionic acid, benzoic acid, m-cresol, phenol, trichloroacetic acid, benzoyl peroxide, and cumene hydroperoxide; organic amines and compounds capable of producing organic amines through decomposition on heating, such as ethylendiamine and tetrabutylammonium hydroxide; and metal salts of organic acids, such as nickel acetate, lead octoate, dimethyltin dilaurate and cobalt naphthenate. Among these, some metal salts, acids, bases and a combination thereof having a moderate activity, such as a combination of octanoic acid and lead octanoate, and a combination of ethylenediamine, are most preferable.

The layer-constructions produced according to the method of the present invention as stated above have a surface hardness higher than those prepared from conventional polysiloxanes with a higher content of alkyl radicals, and also exhibit various excellent characteristics as listed below:

(1) Layer-constructions with a thin layer of silicone resin with a high content of aryl radicals, not available heretofore, can be obtained.

(2) Heat-resistivities higher than that of conventional coated boards with a layer of polysiloxane consisting largely or only of alkyl radicals can be obtained. The present layer of our invention can be practically used at temperatures below 250° C. for a long time. They withstand even higher temperature conditions between 250° C. and 600° C. except when used continuously for a long period. Resistance to light, weathering, chemicals, water and moisture is also excellent.

(3) Good adhesion to various base plates is achieved.

(4) Vacuum metallizing characteristics are surprisingly excellent even at elevated temperatures in comparison with other polymer coatings.

(5) The cured film has a refractive index similar to that of glass and quartz. The coated layer-constructions look as if there is no coating layer when these base substrates are used.

(6) The coated layer is colorless and transparent, but may be colored if desired.

(7) Flexing resistance of the cured film is very high; no cracking or delamination occurs by bending.

(8) Good workability in manufacture and no appreciable problems of environmental pollution are obtained.

With these characteristic features, the layer-constructions of the present invention may be employed for in high temperature applications and in various new fields where conventional coated boards comprising polysiloxanes have a high content of alkyl radicals cannot be applied.

EXAMPLES 1 AND 2

In ex. (1) a 40% xylene solution of a polyphenylmethylsiloxane [phenyl/(phenyl+methyl)=79 mol %] (Resin solution A) or in ex. (2) solution A added with 10% of a 40% solution of a polyphenylethylsiloxane [phenyl/(phenyl+ethyl)=65 mol %] (Resin solution B) (example 2), each containing 1% octanoic acid as the curing agent, were individually painted on aluminium plates and heat-cured according to the heating program as shown in FIG. 1.

After curing at 250° C. for three, six and twelve hours, a coated board with a smooth surface free from cracks was obtained in each case.

However, if a strong acid, such as phosphorus pentaoxide and toluenesulfonic acid, is used in an amount of 1 weight % or more in place of octanoic acid, cracks were observed on the surface of the cured films; hence, these strong acids must be used in an amount less than 1 weight %.

EXAMPLES 3 THROUGH 8

The same resin solutions as in examples 1 and 2 were applied to stainless steel plates and heat cured according to the heating program as shown in FIG. 2. The results are illustrated in Table 1 below.

TABLE 1

| Example | Resin solution | Curing agent | Surface appearance After 12 hrs cure at 250° C. | After 24 hrs cure at 250° C. |
|---|---|---|---|---|
| 3 | A | 1% Benzoic acid | No cracks | No cracks |
| 4 | A | 1% m-Cresol | " | " |
| 5 | A | 1% Phenol | " | " |
| 6 | A | Octanoic acid | " | " |
| 7 | A | 0.25% Dimethyltin dilaurate | " | " |
| 8 | A | 0.25% Cobalt naphthenate | Very slight cracking | " |

In these cases the heating was done more slowly than in Examples 1 and 2, resulting in better results. When a curing agent of lower acidity is used as in Example 8, a satisfactory result is obtained by prolonging the reaction time.

EXAMPLES 9 THROUGH 14

Resin solution A was painted on stainless steel plates and heat cured according to the heating program as shown in FIG. 3. The results are illustrated in Table 2 below.

TABLE 2

| Example | Resin | Curing agent | Surface appearance 5 hrs | 10 hrs | 15 hrs | 20 hrs |
|---|---|---|---|---|---|---|
| 9 | A | 2% Dimethyl sulfate | Slight cracking | No cracks | No cracks | No cracks |
| 10 | A | 2% Trichloroacetic acid | No cracks | No cracks | No cracks | No cracks |
| 11 | A | 2% Phenylpropionic acid | No cracks | No cracks | No cracks | No cracks |
| 12 | A | 5% Benzoyl peroxide | No cracks | No cracks | No cracks | No cracks |
| 13 | A | 5% Cumene hydroperoxide | No cracks | No cracks | No cracks | No cracks |
| 14 | A | No | No cracks | No cracks | No cracks | No cracks |
| 15 | A | 20% CR 25 | No cracks | No cracks | No cracks | No cracks |
| 16 | A | 4% XC 9605 | Very slight | No cracks | No cracks | No cracks |

TABLE 2-continued

| Example | Resin | Curing agent | Surface appearance | | | |
|---|---|---|---|---|---|---|
| | | | 5 hrs | 10 hrs | 15 hrs | 20 hrs |
| 17 | A | 2% Boron trifluoride etherate | cracking Very slight cracking | No cracks | No cracks | No cracks |

CR 25: Toshiba's curing agent (octanoic acid + lead octanoate)
XC 9605: Toshiba's curing agent (organic phosphate + silane coupling agent)

EXAMPLES 18 THROUGH 20

A 30% xylene solution of a polyphenylmethylsiloxane [phenyl/(phenyl+methyl)=83.6 mol %], Resin F, a 30% xylene solution of a polyphenylsiloxane (100% phenyl), resin G, and a mixture thereof with Resin solution A were painted on aluminum plates and heat cured according to the heating program as shown in FIG. 3. The results are shown in Table 3 below.

TABLE 3

| Example | Resin Solution | Curing agent | Surface appearance | | | |
|---|---|---|---|---|---|---|
| | | | 5 hrs | 10 hrs | 15 hrs | 20 hrs |
| 18 | F | 20% CR 25 | No cracking | No cracking | No cracking | No cracking |
| 19 | 75% A + 25% G | 2% Trichloroacetic acid | Slight cracking | Very slight cracking | Very slight cracking | No cracking |
| 20 | F | 0.5 weight % CR 12 | No cracking | No cracking | No cracking | No cracking |

CR 12: Toshiba's curing agent (20% nickel acetate and amines is methanol)

EXAMPLES 21 THROUGH 23

A solution of Resin F was painted on stainless steel plates and heat cured according to the heating program as shown in FIG. 4. The results are illustrated in Table 4.

TABLE 4

| Example | Resin | Curing agent | Surface appearance | | | |
|---|---|---|---|---|---|---|
| | | | 5 hrs | 10 hrs | 15 hrs | 20 hrs |
| 21 | F | 1% Trichloroacetic acid | No cracking | No cracking | No cracking | No cracking |
| 22 | F | 2% Trichloroacetic acid | No cracking | No cracking | No cracking | No cracking |
| 23 | F | 0.5% CR-12 | No cracking | No cracking | No cracking | No cracking |

What is claimed is:

1. Heat resisting layer-constructions consisting of
   (a) a heat resistant, base substrate and
   (b) a resinous layer coated and heat cured on said substrate,
   said resinous layer (b) comprising a polyaralkylsiloxane comprising structural units having the general formula (I)

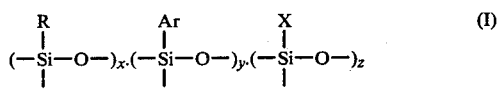

wherein R is a lower alkyl radical; Ar is an aryl radical; X is a polycondensable functional radical; x, y and z, each represents the molar proportion of the unit for which it is the subscript, respectively, and wherein the free bonds in each of the structural units shown in the general formula (I) are selected from the radicals as defined for R, Ar and X, or may combine with one another to form a bridging bond or may be a monofunctional radical, so long as the numerical molar fraction:

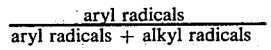

in said polyaralkylsiloxane having the general formula (I) is from 0.65 to 1.00,
the functionality of the polycondensable functional groups in said polyaralkylsiloxane having the general formula (I) is from 2 to 3, and
the ratio of the number of carbon atoms to the number of silicon atoms in said polyaralkylsiloxane having the general formula (I) is from 4.25 to 16.

2. Heat resisting layer-constructions as set forth in claim 1, wherein the alkyl radical is a lower alkyl radical, and the aryl radical is a member selected from the group consisting of phenyl, tolyl and naphthyl.

3. The heat resisting layer-constructions as set forth in claim 2, wherein the alkyl radical is methyl, ethyl or propyl.

4. Heat resisting layer-constructions as set forth in claim 1, 2 or 3, wherein the thickness of said resinous coating film is in the range of 1 to 200μ.

5. Heat resisting layer-constructions as set forth in claim 1, 2 or 3, wherein the thickness of said resinous coating film is in the range of 5 to 50μ.

* * * * *